United States Patent
Jahn et al.

(10) Patent No.: US 7,754,259 B2
(45) Date of Patent: Jul. 13, 2010

(54) METHOD AND DEVICE FOR THE TREATMENT OF MILK, ESPECIALLY BREAST MILK

(75) Inventors: Gerhard Jahn, Rottenburg (DE); Christian P. Speer, Tübingen (DE); Jens Maschmann, Kusterdingen-Jettenburg (DE); Klaus Hamprecht, Tübingen (DE); Klaus Lauf, Tübingen (DE)

(73) Assignee: Eberhard-Karls-Universität Tübingen Universitätsklinikum (DE)

( * ) Notice: Subject to any disclaimer, the term of this patent is extended or adjusted under 35 U.S.C. 154(b) by 880 days.

(21) Appl. No.: 11/303,866

(22) Filed: Dec. 16, 2005

(65) Prior Publication Data

US 2006/0159817 A1   Jul. 20, 2006

Related U.S. Application Data

(63) Continuation of application No. 10/018,052, filed as application No. PCT/EP00/04880 on May 29, 2000, now abandoned.

(30) Foreign Application Priority Data

Jun. 4, 1999  (DE) ................. 199 25 497
Jun. 25, 1999 (DE) ................. 199 29 130

(51) Int. Cl.
    *A23C 3/03* (2006.01)
(52) U.S. Cl. ................. 426/231; 426/580; 426/522; 426/524

(58) Field of Classification Search ................. 426/231, 426/580, 520–522, 524; 99/452–453, 460, 99/466
See application file for complete search history.

(56) References Cited

U.S. PATENT DOCUMENTS

| | | | | |
|---|---|---|---|---|
| 1,369,345 | A * | 2/1921 | Lobeck | 426/522 |
| 1,447,251 | A | 3/1923 | Kitchen | |
| 1,823,637 | A * | 9/1931 | Wright | 426/522 |
| 2,086,324 | A * | 7/1937 | Feremutsch | 204/218 |
| 2,388,103 | A | 10/1945 | Whitaker et al. | |
| 2,734,826 | A * | 2/1956 | Stentz et al | 426/522 |
| 3,934,042 | A | 1/1976 | De Stoutz | |
| 4,376,096 | A | 3/1983 | Bowen | |

(Continued)

FOREIGN PATENT DOCUMENTS

DE          480 452          7/1929

(Continued)

OTHER PUBLICATIONS

J. Dhar, et al., "Pasteurization Efficiency of a HTST System for Human Milk", *Journal of Food Science*, vol. 61, No. 3, 1996, pp. 569-572, 595.

(Continued)

*Primary Examiner*—Drew E Becker
(74) *Attorney, Agent, or Firm*—Knobbe, Martens, Olson & Bear, LLP

(57) ABSTRACT

A method for treating milk, wherein milk is short-term heated in a container. At least during the heating, the container is set in motion in such a way that a milk film forms on the inner wall of the container. A device for carrying out the method is likewise described (FIG. 1).

12 Claims, 4 Drawing Sheets

U.S. PATENT DOCUMENTS

| | | | |
|---|---|---|---|
| RE32,695 E | * | 6/1988 | Nahra et al. ................. 261/118 |
| 4,851,250 A | * | 7/1989 | Bronnert ..................... 426/511 |
| 5,154,940 A | | 10/1992 | Budzyna et al. |
| 5,288,471 A | | 2/1994 | Corner |
| 5,797,313 A | | 8/1998 | Rothley |
| 6,120,824 A | | 9/2000 | Mendez |
| 6,276,264 B1 | | 8/2001 | Dumm |
| 6,617,552 B1 | | 9/2003 | Taylor |
| 2002/0031462 A1 | | 3/2002 | Jorgensen |
| 2005/0112257 A1 | | 5/2005 | Feldmeier |
| 2006/0159817 A1 | | 7/2006 | Jahn et al. |
| 2007/0071867 A1 | * | 3/2007 | Hamprecht et al. ......... 426/580 |

FOREIGN PATENT DOCUMENTS

| | | |
|---|---|---|
| DE | 199 25 497 A1 | 12/2000 |
| DE | 199 29 130 A1 | 12/2000 |
| DE | 10 2004 013 83.4.6 | 3/2004 |
| FR | 2 500 948 | 3/1981 |
| GB | 332950 | 7/1930 |
| GB | 363048 | 12/1931 |
| GB | 634434 | 3/1950 |
| GB | 655198 | 7/1951 |
| GB | 1591821 | 6/1981 |
| WO | WO 00/74494 A2 | 12/2009 |

OTHER PUBLICATIONS

Database WPI, Section Ch. Week 199406, Derwent Publications Ltd., London, GB; Class D13, AN 1994-046406, XP002152882 & RU 2 000 058 C, Sep. 7, 1993.

Database FSTA, Online!, International Food Information Service, Frankfurt/Main, DE; Forsum E., et al., "Protein evaluation in growing rats of breast milk and breast milk substitutes with special reference to the content of non-protein nitrogen." Database accession No. 80-4-01-p0169, XP002152881, and Journal of Nutrition 1979, Inst. of Nutr., Univ. of Uppsala, Sweden.

M. Vochem, et al., "Transmission of cytomegalovirus to preterm infants through breast milk"; The Pediatric Infectious Disease Journal; vol. 17, No. 1; 1998; pp. 53-58.

R.M. Goldblum et al., "Rapid high-temperature treatment of human milk"; The Journal of Pediatrics; vol. 104, No. 3; Mar. 1984; pp. 380-385.

M.Dworsky, et al., "Persistence of cytomegalovirus in human milk after storage"; The Journal of Pediatrics; vol. 101, No. 3; Sep. 1982; pp. 440-443.

K. Hamprecht, et al., "Detection of cytomegaloviral DNA in human milk cells and cell free milk whey by nested PCR"; Journal of Virological Methods; vol. 70; 1998; pp. 167-176.

May, John T., Ph.D., "Breastfeeding The Natural Advantage, International breastfeeding; Clinical Significance and recent studies of the anti-infective properties and infectious contaminates in breast milk"; NMAA International Conference; Oct. 1997; pp. 138-144.

K. Lockridge & B. Van Der Strate, "Cellular Pathogenesis—Posters"; The Journal of Clinical Virology; vol. 12, No. 2, Apr./May 1999; p. 161.

H. Friis & H. Andersen, "Rate of inactivation of cytomegalovirus in raw banked milk during storage at –20 C and pasterurisation"; British Medical Journal; vol. 285; Dec. 1982; p. 1604.

J.K. Welsh, et al., "Effect of Antiviral Lipids, Heat, and Freezing on the Activity of Viruses in Human Milk"; The Journal of Infectious Diseases; vol. 140, No. 3; Sep. 1979; pp. 322-328.

M. Liebhaber, et al., "Alterations of lymphoccytes and of antibody content of human milk after processing"; The Journal of Pediatrics; vol. 91, No. 6; Dec. 1977; p. 897-900.

T.J. Evans et al., "Effect of Storage and heat on antimicrobial proteins in human milk"; Archives of Disease in Childhood; vol. 53; 1978; pp. 239-241.

J.E. Ford, et al.; "Influence of the heat treatment of human milk on some of its protective constituents"; The Journal of Pediatrics; vol. 90, No. 1; Jan. 1997; pp. 29-35.

* cited by examiner

METHOD AND DEVICE FOR THE TREATMENT OF MILK, ESPECIALLY BREAST MILK

RELATED APPLICATIONS

This application is a continuation of U.S. patent application Ser. No. 10/018,052, filed Jun. 7, 2002, now abandoned. The Ser. No. 10/018,052 is a national phase application of the international application PCT/EP00/04880, filed May 29, 2000, and which claims the benefit of the German applications 199 25 497.4, filed Jun. 4, 1999, and 199 29 130.6, filed Jun. 25, 1999.

The present invention relates to a method for the treatment of milk, especially breast milk, in which the milk is short-term heated in a container.

BACKGROUND OF THE INVENTION

1. Field of the Invention

The invention further relates to a device for carrying out this method.

2. Description of the Related Art

Methods and devices of these types are generally known in the prior art. They are used to preserve milk or breast milk intended for storage or later use and/or to remove infectious microorganisms from the milk. Methods of this type are known, for example, under the name pasteurization.

It is now generally acknowledged that feeding a baby with breast milk not only has advantages in relation to the feeding itself but also has immunological advantages, since breast milk contains, besides protein, fat and carbohydrates, inter alia the inhibins lysozyme, lactoferrin, neuraminic acid and specific immunoglobulins, especially sIgA. For this reason, breastfed children are less susceptible to infections and allergens than are nonbreastfed children.

For preterm infants in particular, feeding with breast milk thus has such great advantages that, inter alia for this reason, milk banks were set up in the 1980s for processing of breast milk and storage for later use. For this purpose, milk from various donors was pooled and then subjected to a heat inactivation or a cryoinactivation. For safety reasons, the system of milk banks has now been largely abandoned because, to prevent infections, an unambiguous coordination between the infant and its own mother's breast milk is indispensable. It is intended in this way to prevent uncontrolled transmission of infectious diseases such as HIV, hepatitis etc.

However, for feeding preterm infants, this means that their own mother's breast milk must be pumped off, processed and stored temporarily in the hospital and/or at home since, because of the immaturity and the low food intake capacity, and the frequent feeding associated therewith, these preterm infants cannot be breastfed. An additional factor is that preterm infants frequently remain three to four months in the hospital whereas the mothers are discharged only a short time after delivery, so that appropriate stocks of breast milk must be present in the hospital in order to ensure continuous feeding of the preterm infants. The technical significance of this is that even small volumes of, for example, 20 ml must be processed and stored individually.

Whereas the vertical transmission of HIV, hepatitis and other infectious diseases has become controllable through dispensing with breastfeeding, this does not apply to infections with cytomegalovirus (hereinafter: CMV) which is currently one of the commonest prenatal infections. About 10-20% of all neonates additionally acquire a perinatal infection through breast milk. The course of the illness may be very serious and, especially in preterm infants, fatal.

Vochem et al., Transmission of cytomegalovirus to preterm infants through breast milk, Pediatr Infect Dis J, 1998, Volume 17, pages 53-58, report in this connection on a clinical study in which the risk of transmission of CMV through breast milk to children with a birth weight below 1500 g or a gestational age of less than 32 weeks was investigated. About 50% of the mothers were CMV-seropositive, and 85% of these seropositive mothers excreted CMV in the breast milk, as was demonstrated by an investigation of the cell-free whey. During the study, more than half of the preterm infants breastfed by CMV-seropositive mothers became infected with CMV.

Because of the fact that the authors were able to identify infected breast milk as the only source for the transmission of CMV, they proposed that CMV in pumped-off breast milk be inactivated in order to prevent transmission and avoid an early and thus frequently symptomatic infection of preterm infants.

Besides the classical methods of holder pasteurization and cryoinactivation, the authors proposed that infected breast milk be short-term heated, for ten seconds, at 72° C. without, however, describing accurately the method they used. They report that no traces of infectious viruses were detectable after such brief heating.

In an early study, Goldblum et al., Rapid high-temperature treatment of human milk, The Journal of Pediatrics, 1984, Volume 104, pages 380-385, describe a short-time pasteurization of breast milk by which the number of bacteria and CMV was greatly reduced without destroying many of the constituents important for immunology and nutrition. In the known method, milk from a plurality of donors is pooled (1,2 to 21) and heated by a plate heat exchanger. Since the heat exchanger was designed for treating large volumes of cow's milk, the pooled human milk was injected into a continuous stream of sterile distilled water and heated at 72° C. for 5 seconds, with the desired temperature being reached within less than three seconds. The samples were then cooled to 2° C. within three seconds.

The use of an apparatus which is customary in the dairy industry and has the required large sample volume means that the known method does not comply with the current requirements mentioned at the outset for the treatment of small sample volumes.

In another early study, Dworsky et al., Persistence of cytomegalovirus in human milk after storage, The Journal of Pediatrics, 1982, Volume 101, pages 440-443, report that a holder pasteurization, that is to say heating the milk at 62° C. for 30 minutes leads to complete elimination of CMV from CMV-seropositive milk. However, they mention that this treatment is not ideal if the immunological properties of the milk are to be retained. The pasteurization at a lower temperature, namely 56° C., which was therefore investigated did not, however, show satisfactory elimination of CMV from infected milk.

The results obtained by the authors with cryoinactivation, in which the samples were stored at −20° C. overnight, were likewise unsatisfactory.

SUMMARY OF THE INVENTION

In view of the above, it is an object of the present invention to develop further the method mentioned at the outset, and the device mentioned at the outset, so that the milk can be treated in a simple manner, which is rapid to carry out, even in small amounts so that infectious microorganisms, especially CMV, are reliably inactivated, with the desired constituents preferably being to a very large extent retained.

This object is achieved according to the invention with the method mentioned at the outset by setting the container in motion, at least during heating, in such a way that a film of milk forms on its inner wall.

With the device mentioned at the outset, this object is achieved according to the invention by providing at least one heat source for heating the milk, and a device for setting the container in motion, preferably in rotation, and exposing the container in motion to the heat source for a defined period of time.

The object underlying the invention is completely achieved in this way.

This is because the inventors of the present application have realised that the motion of the container during the exposure to heat prevents the formation of internal temperature gradients because the entire milk volume is uniformly heated. However, this means that no denaturation of constituents takes place and most of the immunological properties of the milk are retained. On the other hand, the inventors were able to establish that there is complete inactivation of infectious microorganisms, especially of CMV and also of, for example, Staphylococcus aureus. Use in the veterinary sector, for example in zoological gardens and for rare mammals, is also possible.

The novel method and the novel device are in addition particularly suitable for very small amounts of milk because local overheating of the milk is prevented by the motion of the container.

It is preferred in this connection if the milk is heated above at least about 65° C. for not more than about 20 seconds, the container being set preferably in rotation, at least during the heating, with a speed of rotation greater than about 150 rpm, preferably greater than about 250 rpm, more preferably than about 300 rpm.

The inventors have found that such speeds of rotation lead to the formation of a very uniform film of milk on the inside of the container, and the temperatures and times employed ensure guaranteed elimination even of high viral doses in small individual amounts of milk.

Although it would also be possible to set the milk in the container in motion by stirring the same, the mechanical agitation of the milk might lead to destruction of the milk cell structure, which is not the case with a motion, preferably rotation, of the container.

It is generally preferred for the container/the breast milk to be exposed for the heating to a first heat source which is set at a first temperature, for a first period of time, then to a second heat source which is at a second temperature, for a second period of time, and finally for cooling to a third heat source which is set at a third temperature, for a third period of time.

In this embodiment it is advantageous that the rate of heating and cooling of the milk can be set individually in such a way that denaturation of constituents due to rapid changes in temperature is avoided. It is thus possible in an optimal manner to choose a slow warm-up phase which ensures gentle and uniform heating even with small amounts of milk.

It is particularly preferred in this connection for the first and/or third heat source to have a waterbath in which the container in motion is immersed.

This measure also ensures a uniform temperature in the treated milk. Although it would also be conceivable to control the temperature of the milk via cooling/heating coils, this would, especially with small amounts of milk, lead to local temperature gradients and thus to denaturation of constituents. In addition, cooling/heating coils are difficult to sterilize and this problem does not occur with waterbaths which come into contact only with the outsides of the containers.

On the other hand, it is preferred for the first heat source to be a hot air source and/or for the third heat source to be a cold air source, and the container in motion is immersed in the air stream of each of them, with the air stream in each case preferably being passed into a chamber with an opening for immersion of the container in motion. The container is thus immersed in an air bath.

It is also possible in this way to generate a uniform temperature in the treated milk. In the simplest case, the hot air source is an air source, for example a blower whose air stream is passed along a heating resistor. In a similar design, the cold air source may also comprise a blower whose air stream is passed over, for example, a Peltier element, a semiconductor element which generates low temperatures on one side through application of a current. Use of air sources in place of waterbaths eliminates the problem of dripping water which is "carried along" with the container removed from the particular waterbath. In this connection, an example of a conceivable variant is for the first heat source to be formed by a hot air source and for the third heat source to be formed by a cooled waterbath.

It is further preferred for the second heat source to be the ambient air.

This measure is advantageous for the design since the inventors have realised that a third waterbath can be dispensed with, so that the novel method can be carried out in a device with only two waterbaths.

It is preferred in this connection for the first temperature to be above 80° C. and preferably to be about 85-90° C., for the second temperature to be below 10° C. and preferably to be about 2-4° C., for the first period of time to be more than 15 seconds and preferably to be about 20-25 seconds, for the second period of time to be less than 15 seconds and preferably to be about 5-10 seconds, and for the third period of time to be more than 10 seconds and preferably to be about 20 seconds.

The inventors of the present application have realised that with these temperatures and periods of time not only is elimination even of very high viral doses guaranteed in small amounts of milk, of 20 ml, but substantial structural integrity of the milk cells is ensured, which has been demonstrated by microscopic examination with vital staining and LDH release in whey. In addition, the novel method indicates no reduction in total protein and albumin in the whey. Although the activity of alkaline phosphatase and lipase is temperature-sensitive, with the novel method the lipase activity, which is ascribed with a key role in the absorption of fats in the preterm infant intestine, is a factor of about 3 higher than after a holder pasteurization (30 minutes, 62° C.). In addition, the concentration of the vitamins B12 and folic acid is not reduced, and there is moreover only a slight reduction in the concentration of sIgA.

Overall, this means that, in contrast to methods known from the literature, even small amounts of milk can be processed reliably in a very rapid but nevertheless gentle manner by the novel method so that complete inactivation in particular of CMV takes place, but important constituents are retained and remain active for the most part.

It is also preferred in this connection for the container to be a glass flask, preferably a round-bottom glass flask.

It is advantageous here that such glass flasks are easy to sterilize and are low-cost, and because of the limited thermal conductivity of glass, a local heating of the milk content on immersion in the heating bath is prevented, which likewise avoids, in an advantageous manner, an unwanted denaturation in particular with small amounts of milk.

It is further preferred for the container to have a volume which is at least about ten times larger than the volume of the milk.

It is advantageous here that with such volume ratios there is formation, especially in a rotating container, of a uniform, favorably distributed film of milk which allows the described reliable inactivation with retention of the protective effect and nutritional function of the milk.

It is generally also preferred for the temperature of the milk to be monitored.

It is possible in this way for there to be feedback control of the residence time in the individual heat sources, so that it is not absolutely necessary to operate with rigidly preset times. This has advantages, for example, when milk varying in quantity and varying in consistency is to be treated successively by the novel method. The method and the device adapt themselves as it were automatically in this way to the amount of milk to be treated in each case.

It is also preferred for the novel device to comprise a receptacle for the container, which receptacle is capable of horizontal and vertical movement and has a rotating drive for the container, the receptacle preferably being provided with a locking securement means for the container, further preferably for one neck of a glass flask. The temperature probe in this case is fastened to the receptacle in a non-corotating, preferably resilient, manner.

The locking securement means makes rapid installing and retrieving of the glass flask in the device possible. As a result of the temperature probe being arranged in a non-corotating manner, the temperature of the milk is measured not just at one point in the container but over the entire periphery of the container, leading to an averaging of the temperature. The resilient arrangement of the temperature probe on the receptacle advantageously ensures that the temperature probe is not damaged when it is in contact with the inner wall of the container and the rotating container is not exactly rotationally symmetrical.

Further advantages emerge from the description and the appended drawing.

It is self-evident that the aforementioned features and those to be explained hereinafter can be used not just in the combinations indicated in each case but also in other combinations or alone without leaving the scope of the present invention.

The figures show embodiments of the device according to the invention. In the figures:

DETAILED DESCRIPTION OF THE PREFERRED EMBODIMENTS

Example 1

Short-Time Heat Inactivation of Breast Milk

Native milk from breastfeeding, CMV-seronegative mothers is pumped off and divided into 20 ml samples. A defined amount of virus of the virus strain CMV AD 169 is added to this sample in order to produce milk samples with a defined viral load.

For this purpose, two virus-containing solutions were produced starting from a culture supernatant after centrifugation at 1000×g:

a) 5 ml of the culture supernatant are cryopreserved immediately at −70° C.

b) The culture supernatant is placed in 1.5 ml tubes and, after a virus pelleting (30 min at 25000×g), 1.4 ml of supernatant are discarded. The pellet is in each case resuspended in 100 µl of supernatant and, after pooling, cryopreserved in 100 µl samples likewise at −70° C.

The $TCID_{50}/100\,\mu l$ (tissue culture infective dose 50%), that is to say the dilution level at which 50% of the inoculated microcultures (at least eight replicates) still show a positive virus detection, for both solutions was in each case $10^{-5.876}$.

In addition, the breast milk from a CMV-seropositive breastfeeding mother was tested.

Figure 1:
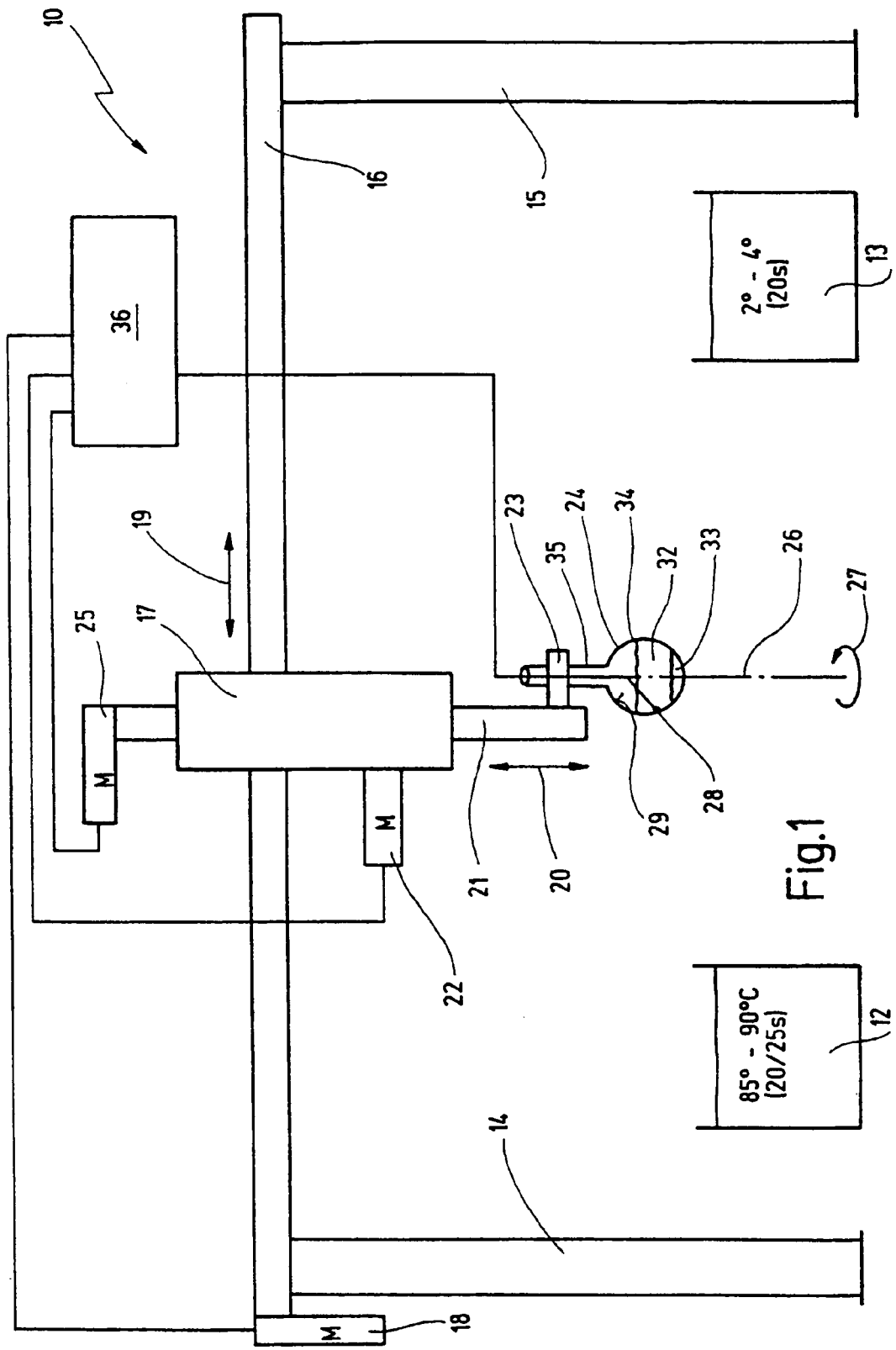
FIG. 1 is a first embodiment of the novel device in a highly diagrammatic side view.

The samples produced in this way are on the one hand subjected to a short-time heat treatment in the device 10 shown in single FIG. 1.

For this purpose, the device 10 comprises two waterbaths 12 and 13 over which extends a gantry beam 16 supported on two posts 14, 15. A trolley 17 is displaceably mounted on the gantry beam 16 and can be driven by a motor 18 in the direction of a double-headed arrow 19.

A rod 21 whose height can be adjusted in the direction of a double-headed arrow 20 is provided on the trolley 17 and is controlled in its lifting movement by a motor 22 which is likewise mounted on the trolley 17.

The rod 21 has at its lower end a rotating holder 23 in which a glass flask 24 is clamped. The rod 21 has at its upper end a motor 25 by which the glass flask can be set in rotation around its vertical axis 26, as indicated by an arrow 27.

A temperature probe 28 is also attached to the rod 21 and projects into the glass flask 24 and is in contact, where appropriate resiliently, with its inner wall 29.

The glass flask 24 contains a sample of breast milk 32 which has been prepared as above and is to be treated and which has a volume of about 20 ml, 33 indicating the volume when the glass flask 24 is at rest.

When the glass flask 24 is set in rotation by the motor 25, the breast milk forms on the inner wall 29 of the glass flask 24 a milk film, which film is indicated by 34 and covers about half the inner wall 29. This formation of the milk film is achieved owing to the fact that the glass flask 24 has about ten times the volume of the breast milk 32, in the present case a volume of 250 ml (round-neck glass flask with joint), which rotates at a speed of about 300 rpm.

The glass flask 24 can now be immersed via the motors 18 and 22 in one of the two waterbaths 12, 13, the depth of immersion being chosen so that the glass flask 24 is immersed up to its neck 35 in the water in the particular waterbath 12 or 13.

Sequence control is effected by a control circuit 36 to which both the motors 18, 22 and 25 and the temperature probe 28, which in the experimental stage indicates the particular temperature of the breast milk, are connected.

It may be mentioned in this connection that it is possible on use of the novel device in a hospital to dispense with a temperature probe because a large number of experiments has proved that with preset temperatures and residence times the changes in temperature in the breast milk 32 are reproducible. Dispensing with the temperature probe 28 has the additional advantage that no special measures have to be used to sterilize the temperature probe in order to prevent cross contamination between successively treated milk samples. The glass flask 24 can moreover be sterilized in a simple manner so that, overall, the risk of cross contamination is avoided.

The novel method then takes place in such a way that firstly the required amount of breast milk, that is to say 20 ml in the chosen example, is put into a fresh glass flask 24. The glass flask 24 is then clamped in the rotating holder 23 and set in rotation at a speed of about 300 rpm by means of the motor 25, so that the milk film 34 is formed.

The glass flask 24 is then, for the purpose of rapid heat exchange, immersed up to its neck 35 in the waterbath 12, which is heated to 85-90° C., by running the motors 18 and 22.

The glass flask 24 remains for 20/25 seconds in the waterbath 12 and is then automatically lifted out again. The temperature of the milk film is then 68/70° C.

The glass flask 24 is subsequently exposed to air for 5 seconds, while still rotating, during which the milk film reaches a target temperature of about 72° C. through heat exchange with the surroundings.

The glass flask 24 is then immersed in the waterbath 13 which has a temperature of 2-4° C. The glass flask 24 remains there for about 20 seconds, while still rotating, after which the breast milk 32 has returned to a temperature of about 30° C.

The entire inactivation cycle thus takes only about one minute, so that the novel device is also suitable for hospitals where many individual milk samples must be heat-inactivated successively and without the risk of cross-contamination. Since—as already mentioned—a temperature probe 28 may be unnecessary for hospital routine, or the temperature probe 28 may be used only occasionally to check the method, it is necessary after the treatment of a first milk sample merely to remove the glass flask and replace it by a new glass flask charged with a new milk sample. It is possible in this way for a large number of milk samples to be rapidly inactivated in succession.

The milk samples treated in this way are then stored in small vessels such as, for example, small milk bottles, after which the glass flasks which have been used are cleaned and sterilized so that they can be reused.

It may also be mentioned that with a different amount of milk it is possible to employ a correspondingly large glass flask and/or an altered speed of rotation, but the new values can easily be determined with the aid of the temperature probe.

The device 10 is moreover not only suitable for use in a hospital but can also be employed by mothers at home. In addition, not only is CMV infectivity precluded by the method, it is also possible to inactivate other infectious microorganisms such as, for example, *Staphylococcus aureus*.

The results of the inactivations carried out by way of example are given below in Examples 4 and 5.

Figure 2:
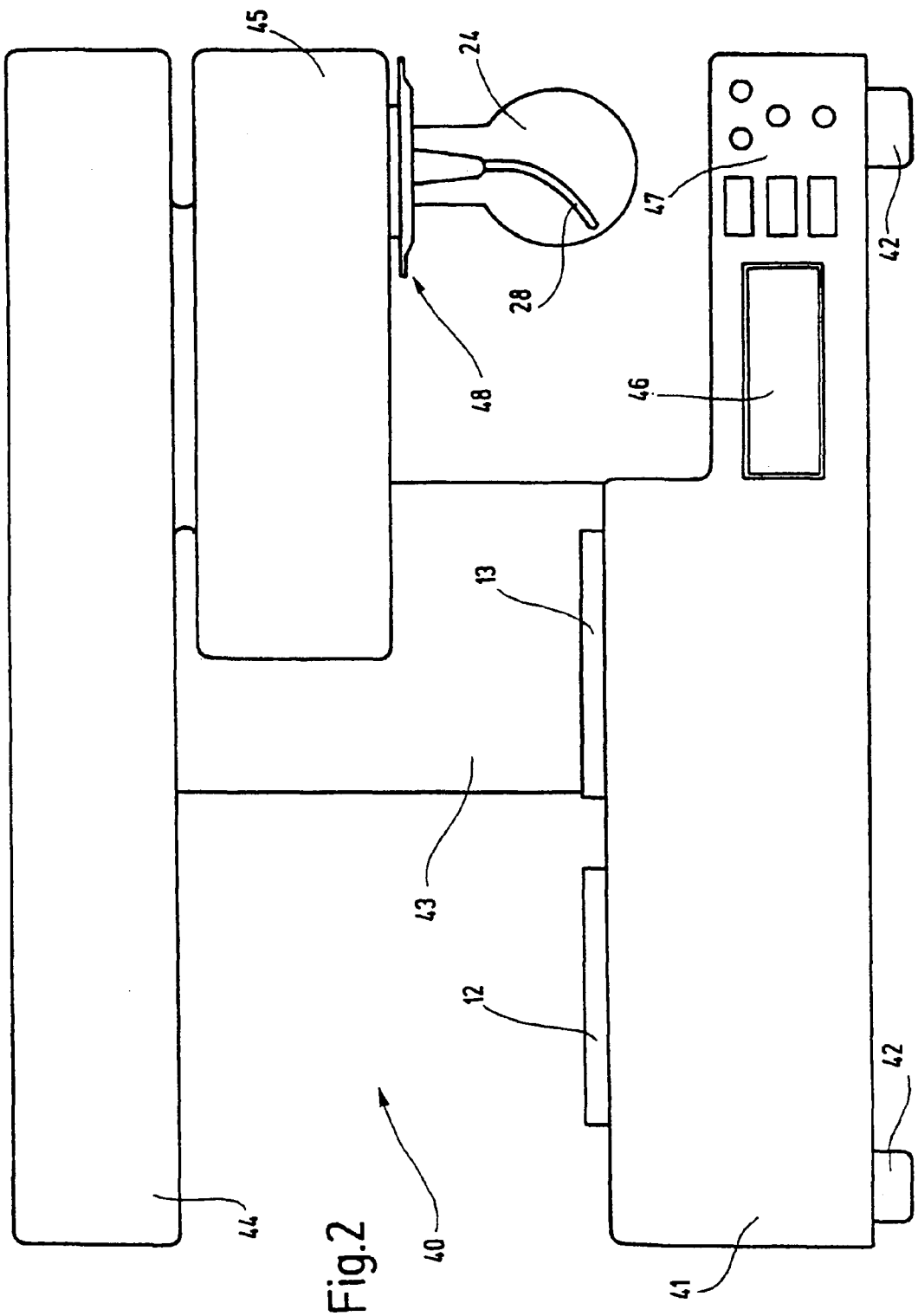
FIG. 2 is a second embodiment of the novel device in side view.

FIG. 2 shows another device 40 which is suitable for treating milk.

The device 40 has a basic frame 41 with feet 42. A vertical rail 43 on which a crossmember 44 is mounted to be vertically movable is disposed on the basic frame 41. A trolley 45 is capable of horizontal movement parallel to the crossmember 44. The glass flask 24 is fixed to the trolley 45 in such a way that it can be set in rotation as already described in connection with FIG. 1.

The waterbaths 12 and 13 already known from FIG. 1 are integrated into the basic frame 11. The glass flask 24 can be immersed successively, with the aid of the trolley 45 which is capable of horizontal travel and of the crossmember 44 which is capable of vertical travel, first in the waterbath 12 and then in the waterbath 13. The glass flask 24 is rotated at least in the lowered state so that the milk forms a thin film on the inner wall of the glass flask 24, ensuring an optimal temperature transition from the waterbaths 12, 13 to the milk.

A temperature display 46 is additionally integrated into the basic frame 41 and displays the temperature measured by the temperature probe 28. Also integrated into the basic frame 41 is an operator control unit 47.

Figure 3:
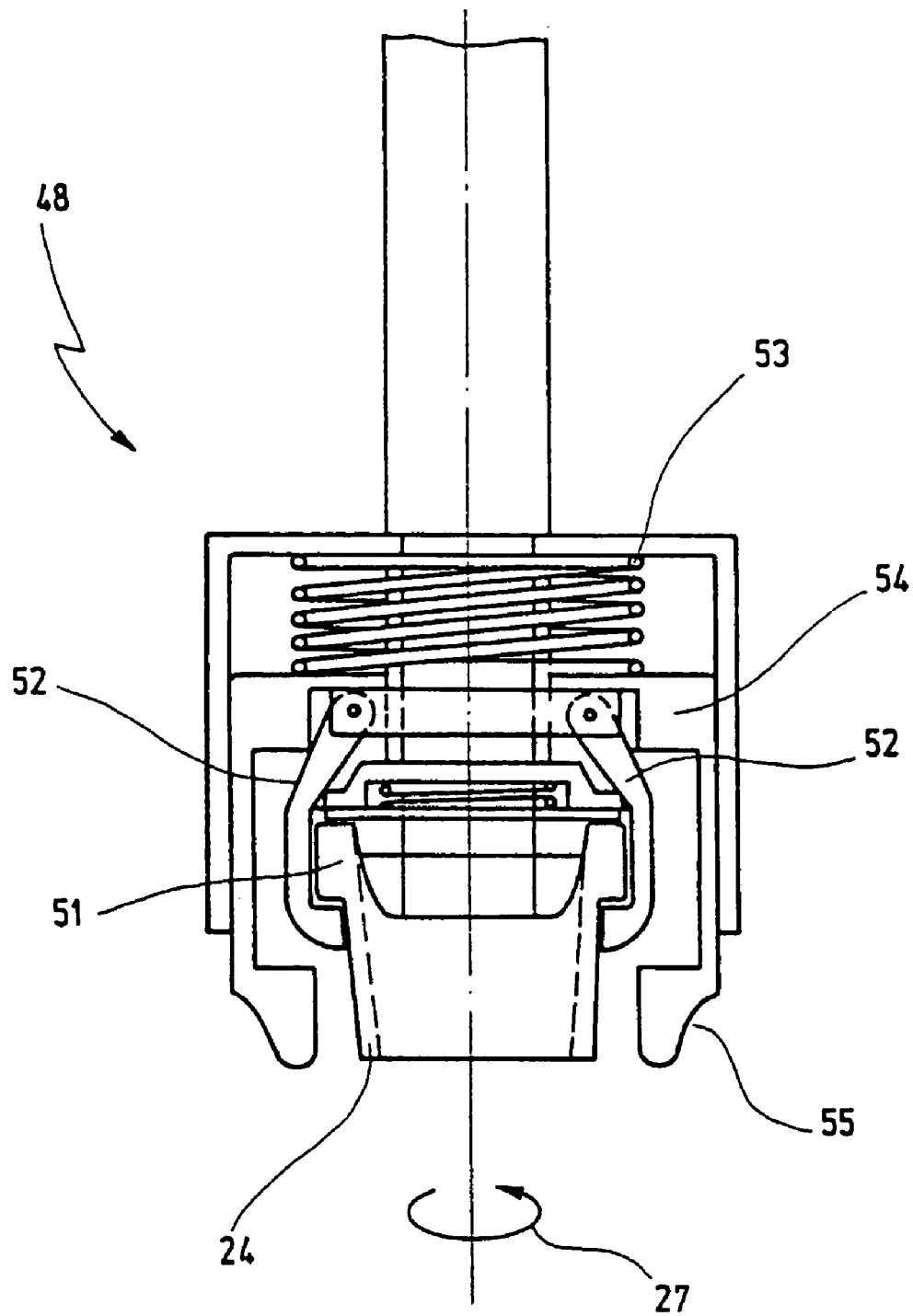
FIG. 3 is an enlarged side view of a receptacle for a glass flask.

The glass flask 24 is fixed on the trolley 45 by means of a receptacle 48 which is shown in detail in FIG. 3.

The receptacle 48 grips the glass flask 24 on whose neck region a peripheral bead 51 is provided. The glass flask 24 is held by hinge-mounted clamps 52 which grip over the bead 51. The clamps 26 can be moved vertically against the force of a spring 53. To fix the glass flask 24, the neck region with the bead 51 is moved upward against the clamps 52, which are thus opened and receive and firmly clamp the bead 51. In this state, the receptacle 48 is set in rotation along the arrow 27, whereby the glass flask 24 also rotates and the milk film is formed on the inner wall of the glass flask.

To remove the glass flask 24, an inner region 54 on which the clamps 52 are hinge mounted is pushed upward against the force of the spring 53 by a manual manipulation of the grip region 55. The movement of the inner region 54 upward causes the clamps 52 to open, and the glass flask 24 can be removed.

Figure 4:
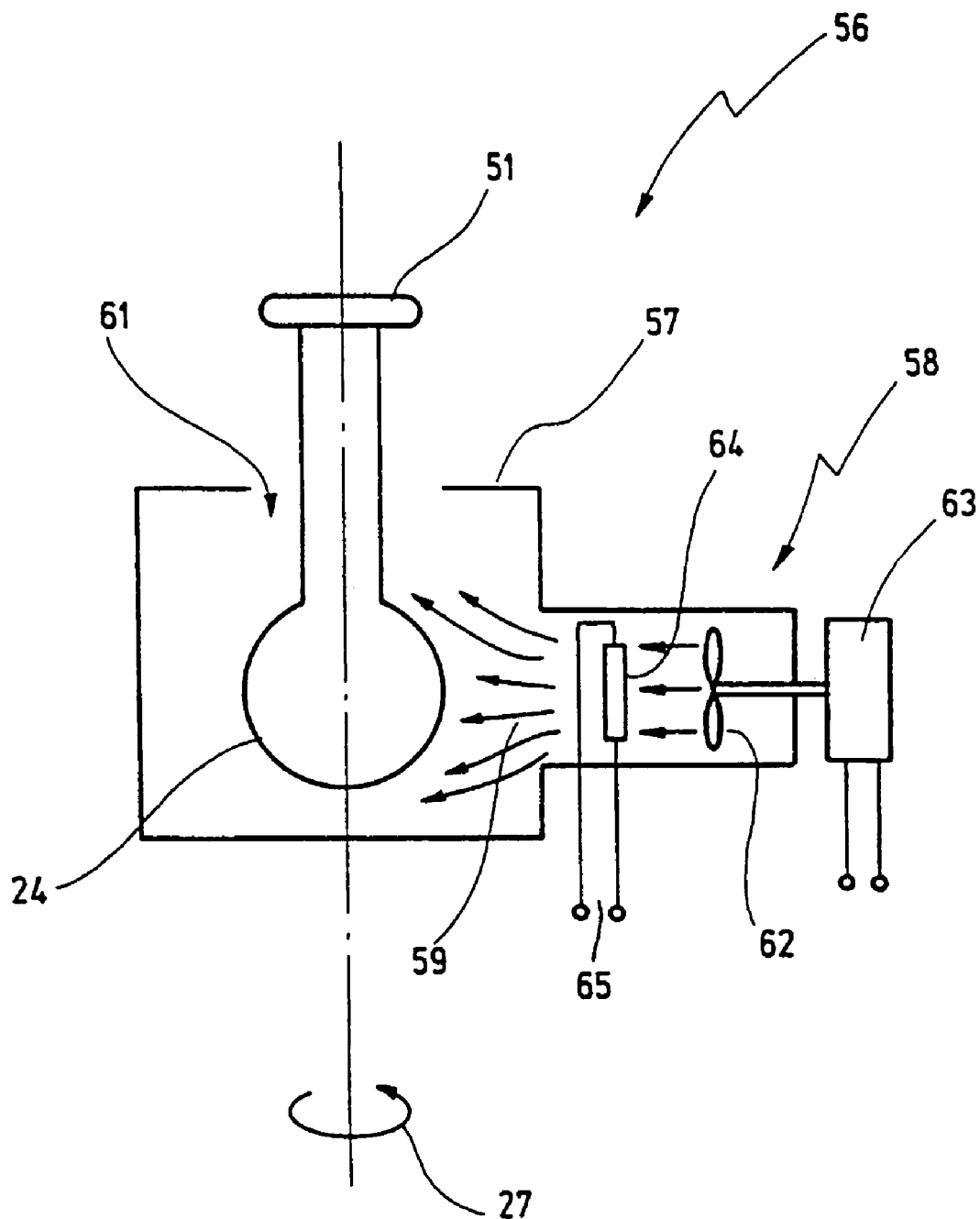
FIG. 4 is a diagrammatic side view of an air bath which can be used with the devices of FIGS. 1 and 2.

In place of the waterbaths 12, 13 it is also possible to use as heat source an airbath 56 which is depicted in a diagrammatic, cross-sectional side view in FIG. 4. The airbath 56 comprises a chamber 57 to which an air source 58 is connected and passes an air stream 59 into the inside of the chamber 57.

An upper opening 61 is provided in the chamber 57, and through this it is possible for the glass flask 24 to be immersed in the chamber 57 and thus in the air stream 59.

The air source 58 comprises a fan 62 which forms, together with a motor 63, a blower which passes the air stream 59 over a temperature member 64 which is supplied with current through connections 65.

The temperature member 64 is either a heating resistor or a Peltier element so that the airbath 56 can replace the waterbath 12 and/or the waterbath 13.

Example 2

Holder Pasteurization

For comparison, samples like those also used in Example 1 were subjected to a holder pasteurization, that is to say heated at 62.5° C. for 30 minutes in each case.

The results given in Examples 4 and 5 show that every virus infection is eliminated by this holder pasteurization, but the holder pasteurization leads to a distinct reduction in lactoferrin, and the lipase activity, which is ascribed with a key role in the absorption of fats in the preterm infant intestine, is less by a factor of about 3 compared with the short-time heat inactivation from Example 1.

Example 3

Cryoinactivation

As further comparison, a cryoinactivation was carried out with samples as in Examples 1 and 2, the samples being stored at 20° C. for 18 h/3 d/10 d.

The rate of the remaining infectivity measured by the inventors of the present application was still 20% even on storage at 20° C. for ten days, which is distinctly higher than described in the literature. The inventors of the present application attribute this to the measurement methods associated with the methods described in the earlier literature lacking the sensitivity which can be achieved today.

Example 4

Check of inactivation

To detect the CMV infectivity, the CMV DNA and the CMV RNA, the milk is fractionated after the inactivation, and the cell-free and low-fat whey fraction is used for the detection. Hamprecht et al., Detection of cytomegalovirus DNA in human milk cells and cell free milk whey by nested PCR, Journal of Virological Methods, 1998, Volume 70, pages 167-176, describe the advantage of using the whey fraction compared with the treated native milk as being that the cytotoxicity of the native milk in cell cultures falsifies the results of measurement.

For this reason, the whey preparation according to Hamprecht et al., 1998, was used as follows for checking the inactivation:

1-2 ml of breast milk is centrifuged at 400×g and at room temperature for 10 minutes, the creamy top layer is discarded and the cloudy supernatant is again centrifuged at 400×g for 10 minutes. Cell debris in the supernatant is then collected by centrifugation at 3200×g for 10 minutes, and the resulting supernatant is filtered through a filter with a pore size of 0.22 µm (Sartorius). The filtered whey is used for in vitro cell culture assays.

The cells employed are human foreskin fibroblasts (HFF) with an adherence time of 4-5 hours. Microtiter plates served as culture supports with $2.5 \times 10^4$ HFF/microculture/100 µl MEM-5% FCS as medium. Eight replicates were employed for each sample.

Each 100 µl samples of the individual whey preparation were used for sample inoculation and the adsorption time was 2 h.

Four microcultures were employed to detect CMV IEA (immediate early gene antigen; phosphoprotein pp72). This viral antigen is used to detect viral infectivity, and it is detectable in fibroblast cell nuclei already 2-4 hours after a viral infection.

Four other microcultures were used to detect late CMV RNA pp67 mRNA by means of a nucleic acid sequence-based amplification, NASBA for short, as described by Compten, Nature, 350: 91-92, 1991. This method makes it possible to amplify RNA in the presence of DNA.

After a short-term culture (18 hours) it is possible to detect diffusely distributed infected single cell nuclei in the microculture, provided an infection is present.

On long-term culture (5 d), infected cell nuclei form plaques which each develop from an infected fibroblast cell.

Table 1 below shows the results of the tests of Examples 1-3, stating in each case the titer of the virus solution, the nature of the inactivation, the duration of the cell culture assay, the number of infected cells, the detected IE DNA and the detected pp67 mRNA which, in contrast to the CMV infection represents a CMV illness.

TABLE 1

Selected results of tests for Examples 1-3

| $TCID_{50}/$ 100 µl | Sample | Inactivation | Assay | IEA+/total | IE DNA | pp67 mRNA |
|---|---|---|---|---|---|---|
| $10^5$ | CC control | — | 15 h | 76/76 | ./. | ./. |
| | spiked whey | — | 15 h | 22/103 | ./. | ./. |
| | spiked whey | 10" 72° C. | 15 h | 0/116 | ./. | ./. |
| Donor CMV-seropositive | whey | — | 5 d | 4/104 | ./. | ./. |
| | whey | 10" 72° C. | 5 d | 0/120 | ./. | ./. |
| | whey | 20" 72° C. | 5 d | 0/124 | ./. | ./. |
| $10^4$ | CC control | — | 6 d | — | + | + |
| | spiked whey | — | 6 d | confl.plaques | + | + |
| | spiked whey | 5" 72° C. | 6 d | Ø/well | + | − |
| | spiked whey | 10" 72° C. | 6 d | Ø/well | + | − |
| | spiked whey | 30' 62° C. | 6 d | Ø/well | + | − |
| $10^3$ | CC control | — | 6 d | — | + | + |
| | spiked whey | — | 6 d | 6 plaques/well | + | + |
| | spiked whey | 5" 72° C. | 6 d | Ø/well | + | − |
| | spiked whey | 10" 72° C. | 6 d | Ø/well | + | − |
| $10^4$ | CC control | — | 5 d | 324/324 | ./. | ./. |
| | spiked whey | — | 5 d | 24/77 | ./. | ./. |
| | spiked whey | 3 d-20° C. | 5 d | 45/333 | ./. | ./. |
| | spiked whey | 10 d-20° C. | 5 d | 73/361 | ./. | ./. |
| $10^4$ | CC control | — | 18 h | — | ./. | ./. |
| | spiked whey | 18 h-20° C. | 18 h | 220/well | ./. | ./. |

CC control = cell culture control (without sample)
spiked whey = whey mixed with CMV AD 169

Both with the holder pasteurization and with the short-time heat inactivation according to the invention, in contrast to cryoinactivation, neither viral antigen (IEA) nor late viral RNA (pp67 mRNA) are detectable by the very sensitive NASBA method. Viral DNA is, however, detected, but this does not indicate a persisting infection but merely the thermal stability of the viral DNA.

This means that the short-time inactivation effectively eliminates the infectivity.

Example 5

Biochemical Parameters

The inactivation methods described in Examples 1 to 3 were characterized by measuring additional biochemical parameters, and the results are indicated in Table 2 below.

TABLE 2

Biochemical parameters of selected results of Examples 1-3

| | Control Whey + CMV AD 169 untreated | Short-term 5″72° C. | Short-term 10″72° C. | Cryo 18 h-20° C. | Cryo 3 d-20° C. | Cryo 10 d-20° C. | Holder 30′62° C. |
|---|---|---|---|---|---|---|---|
| CMV-IEA | | | | | | | |
| nuclei (18 h) | 157/well | Ø/well | Ø/well | 220/well | 53/well | 32/well | Ø/well |
| plaques (6 d) | confluent | Ø/well | Ø/well | confluent | 35 plaques/well | 29 plaques/well | Øwell |
| CMV IE DNA nPCR 18 h/6 d) | + | + | + | + | + | + | + |
| CMV pp67 mRNA NASBA (18 h/6 d) | + | − | − | ? | + | + | − |
| Total protein g/dl | 1.07 | 1.07 | 1.07 | 1.06 | 1.07 | 1.05 | 1.07 |
| Albumin g/dl | 0.27 | 0.37 | 0.37 | 0.27 | 0.28 | 0.27 | 0.37 |
| Alkaline phosphatase U/l | 28 | Ø | Ø | 30 | 32 | 30 | Ø |
| LDH U/l | 78 | 38 | 46 | 254 | 322 | 316 | 188 |
| Amylase U/l | 1242 | 1173 | 1215 | 1290 | 1281 | 1209 | 1122 |
| Lipase U/l | 2685 | 53 | 56 | 2583 | 2763 | 2697 | 18 |
| Vitamin B12 ng/dl | 42 | 42 | 43 | 43 | — | 44 | 44 |
| Folic acid ng/dl | 550 | 697 | 735 | 875 | — | — | 1045 |
| sIqA mg/l | 1700 | 1200 | 1200 | 1700 | 1700 | 1700 | 1200 |

Inoculation: $10^4$ $TCID_{50}$/100 µl AD 169 in native milk
Assay: 18 h (diffuse CMV IEA nuclear staining); 6 d (plaque formation)

The short-time heat inactivation method shows no reduction in total protein and albumin in the whey. On the other hand, the alkaline phosphatase and lipase activity is temperature sensitive. The lipase activity, which is ascribed with a key role in the absorption of fats in the preterm infant intestine, is, however, a factor of about 3 greater with the novel method than after holder pasteurization. The lipase activity is additionally ascribed an important antiviral protective action so that the novel method displays distinct advantages compared with holder pasteurization.

The vitamin B12 and folic acid concentration is not reduced by the novel method. It also emerges that sIgA is substantially thermally stable but is slightly reduced by both heat inactivation steps. The cryoinactivation has no effect on the sIgA level, on the other hand.

The invention claimed is:

1. A method for treating milk contained in a container having an inner wall, comprising the steps of:
   setting a container holding milk in motion thereby forming a milk film on an inner wall of the container,
   heating the milk film at least whilst the container is in motion, wherein the container with the milk film is exposed for heating to a first heat source comprising an air bath which is set at a first temperature, for a first period of time and then to a second heat source which is set at a second temperature, for a second period of time, and
   exposing the container to a cooling source which is set at a third temperature below both the first and second temperatures, for a third period of time, wherein the container in motion is immersed in an air stream of the air bath.

2. A method as in claim 1, wherein the cooling source comprises a waterbath.

3. A method as in claim 1, wherein the air stream is passed into a chamber with an opening for immersion of the container in motion.

4. A method as in claim 1, wherein the third temperature is below 10° C.

5. A method as in claim 1, wherein the first period of time is more than 15 seconds.

6. A method as in claim 1, wherein the second period of time is less than 15 seconds.

7. A method as in claim 1, wherein the third period of time is more than 10 seconds.

8. A method as in claim 1, wherein the container is set in rotation, at least during the heating, with a speed of rotation greater than about 150 rpm.

9. A method as in claim 8, wherein the speed of rotation is greater than about 300 rpm.

10. A method as in claim 1, wherein the container comprises a glass flask.

11. A method as in claim 1, wherein the container has a volume which is at least about ten times larger than the volume of the milk.

12. A method as in claim 1, comprising the further step of monitoring the temperature of the milk.

* * * * *